Figure 1:
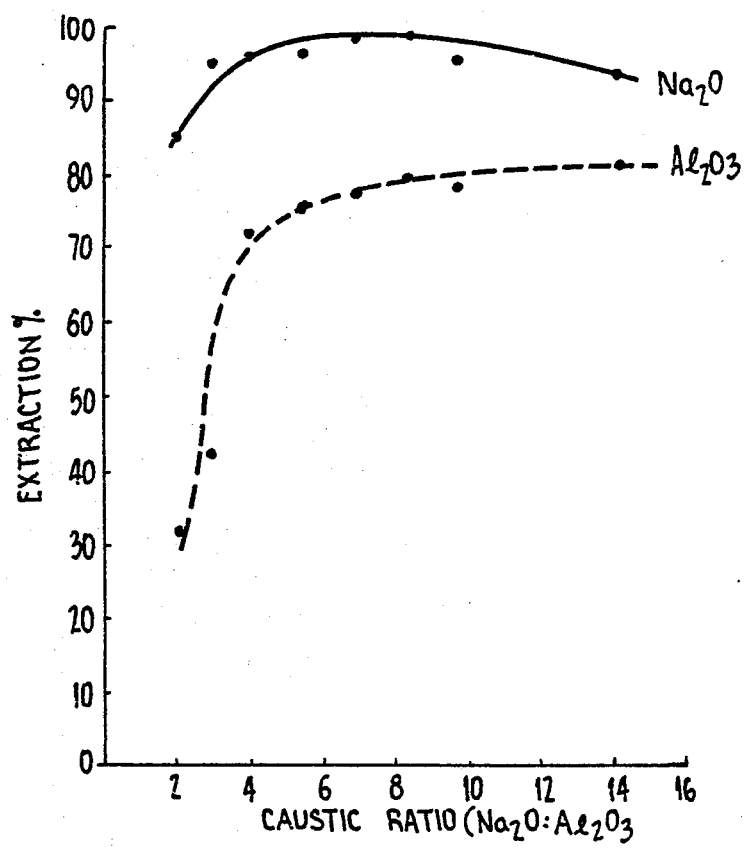

United States Patent [19]

Cresswell et al.

[11] Patent Number: 4,483,830
[45] Date of Patent: Nov. 20, 1984

[54] PRODUCTION OF ALUMINA

[75] Inventors: Pearson J. Cresswell, Clifton Hill; David J. Milne, North Balwyn, both of Australia

[73] Assignee: Comalco Limited, Melbourne, Australia

[21] Appl. No.: 414,588

[22] Filed: Sep. 3, 1982

[30] Foreign Application Priority Data

Sep. 10, 1981 [AU] Australia ............... PF0711

[51] Int. Cl.$^3$ ............................................. C01F 7/00
[52] U.S. Cl. .................................... 423/118; 423/121; 423/123; 423/131; 423/205; 423/641
[58] Field of Search ............... 423/131, 121, 119, 127, 423/129, 140, 123, 118, 641, 205

[56] References Cited

U.S. PATENT DOCUMENTS 3,210,155 10/1965 Cagnolatti ........................ 423/121
3,868,442 2/1975 Fish ..................................... 423/121
3,944,648 3/1976 Solymár et al. ................... 423/131
3,998,927 12/1976 Hudson et al. .................... 423/131
4,044,095 8/1977 Hudson et al. .................... 423/131

FOREIGN PATENT DOCUMENTS 1047230 1/1979 Canada ............................. 23/246

Primary Examiner—John Doll
Assistant Examiner—Robert L. Stoll
Attorney, Agent, or Firm—Larson and Taylor

[57] ABSTRACT

A process for recovery of alumina and soda from materials containing sodium aluminosilicates, such as red mud and desilication products, comprises treating said materials with lime at elevated temperature and pressure. In a preferred embodiment of the invention, hydrothermal treatment of red mud with lime is integrated into a Bayer process to improve the overall efficiency of that process.

5 Claims, 4 Drawing Figures

BATCH TEST EXTRACTION OF $Na_2O$ (TOP) AND $Al_2O_3$ (BOTTOM) FROM RED MUD AS A FUNCTION OF CAUSTIC RATIO. Ca:Si = 2.1, 80% WATER 300°C, 2 HOURS.

EXTRACTION OF $Na_2O$ (FULL LINE) AND $Al_2O_3$ (DASHED LINE) FROM RED MUD AS A FUNCTION OF Ca:Si RATIO, a=6.4, 300°C, 2 HOURS

PRODUCTION OF ALUMINA

This invention relates to a process for production of alumina from aluminous ores and, in particular, to improvements in the process for extraction of alumina from ores containing significant quantities of reactive silica, such as high silica bauxites.

In the known process for extraction of alumina from bauxite, generally known as the Bayer process, bauxite is ground, mixed with a caustic aluminate liquor and subjected to digestion at temperatures commonly as high as 245° C. In the course of this digestion the alumina values represented by minerals such as, for example, Gibbsite and Boehmite in the ore are dissolved. Various gangue minerals, such as haematite and anatase or rutile, are not dissolved and remain as a solid phase generally known as "red mud". Also present in the bauxite are the minerals kaolinite and quartz. Under the conditions of digestion, substantially all of the kaolinite and a significant fraction of the quartz may dissolve, this constituting the so called "reactive silica" component of the bauxite. This dissolved silica is however not stable in the caustic aluminate liquor and is reprecipitated on the red mud and also in the form of scale on reaction vessels and pipes. This so called "desilication product", or DSP is a complex sodium aluminosilicate material of variable composition which may also include other species present in the liquor.

The composition of a typical desilication product may be described by the following formula:

Na$_2$O Al$_2$O$_3$ 2SiO$_2$ ⅓(Na$_2$X)$n$H$_2$O where the anionic component $X^{-2}$ is derived from any of the constituents of impurities existing within the Bayer liquor such as hydroxide, aluminate, carbonate, sulphate, chloride ion or indeed any combination of these or other available species. It should be understood that the stoichiometry of the DSP is not well defined any may be expected to vary within a range of that indicated by the above formula.

It will be seen from the above formula that the DSP contains, besides silica, substantial quantities of alumina and soda, both in the form of caustic soda (Na$_2$O) and of other sodium compounds (Na$_2$X). Both the soda and alumina contained within the DSP, whether deposited as a fraction of the red mud or as scale, are effectively lost to the Bayer process. The alumina loss represents a portion of the total alumina in the bauxite which cannot be recovered when the bauxite is treated by the Bayer process. The soda represents a loss to the process which must be made up continuously or at intervals, as by the addition of fresh caustic soda.

It should be understood that the losses of soda and alumina consequent on DSP formation are directly proportional to the amount of reactive silica contained within the bauxite. Thus, when processing bauxites of increased reactive silica content to recover alumina, the cost of the product alumina is increased due to both the lower effective yield of alumina available from the bauxite and the larger quantities of caustic soda which are required to be added. Because of these costs there is a limit to the amount of reactive silica allowable in bauxite such that it may be economically processed by the Bayer process. Although costs will vary from one place to another, it can be said that the limiting reactive silica content is about 5–6% as SiO$_2$. At this level the consumption of caustic soda (as NaOH) is of the order of 100kg/tonne of Al$_2$O$_3$ produced.

The reactive silica contents of bauxites vary according to the orebody from negligible to values of 10–15%. In particular there are substantial mineable deposits with reactive silica contents within the range 5–10% SiO$_2$ which cannot be economically treated under the existing state of the art of Bayer technology. It is the purpose of the invention described herein to provide a method where by the losses of soda and alumina incurred on desilication are substantially reduced such that bauxite containing higher levels of reactive silica may be economically treated. It will also be apparent that the method of the invention confers advantages on the general operation of the Bayer process in quite unexpected ways.

A number of methods have been proposed to reduce the cost of soda loss in DSP. In one case lime (CaO) is added to the digestion to displace soda. Alternatively the lime may be used to treat the mud after separation from the sodium aluminate liquor. In either case the displacement is inefficient because the product formed is a calcium aluminosilicate of typical formula:

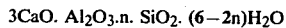
3CaO. Al$_2$O$_3$.n. SiO$_2$. (6−2n)H$_2$O

As a result lime use is higher than would be expected on the basis of direct replacement and alumina losses are also increased.

Another alternative is to sinter the ore with lime and soda. This process fixes the reactive silica as insoluble calcium silicate. Sodium aluminate may be leached from the sinter for recovery of alumina.

A variation on this process is to sinter the red mud from the Bayer process with lime in order to convert the DSP to calcium silicate and soluble sodium aluminate. These sinter processes are technically complex and require a high energy input.

We have found that if the red mud from Bayer digestion is treated with lime under hydrothermal conditions then essentially all of the desilication product soda and most of the alumina can be recovered. We have also found that this process can be integrated with the traditional Bayer process in such a way as to improve the efficiency of the whole significantly beyond that which would normally be expected by practitioners of the art.

Accordingly in a general aspect the invention provides a process for recovery of alumina and soda from materials containing sodium aluminosilicates, such as red mud and desilication products, which comprises treating said materials with lime at elevated temperature and pressure.

In a preferred embodiment of the invention, hydrothermal treatment of red mud with lime is integrated into a Bayer process to improve the overall efficiency of that process.

In the process red mud slurry or filter cake issuing from the Bayer process is mixed with a strong caustic solution, low in aluminate, such that the final A/C of the digested mixture is less than about 0.3 and preferably in the range 0.15–0.2. The A/C of the liquor is defined as the ratio of the alumina content of the liquor, expressed as gpl of Al$_2$O$_3$, to the soda content, expressed as gpl of Na$_2$CO$_3$. Lime (CaO) is added to achieve a stoichiometric ratio with respect to the silica in the mud in the range 1.5–2.5 and preferably 2.0–2.2. Soda concentrations are in the range 9–20% Na$_2$O in the reacting mixture. The mixture is digested under pressure at a temperature in the range 260°–320° C., preferably 290°–310° C. for ½ to 2 hours. Pressures in the range of 4–9 MPa are suitable. The result is the recovery of typically 95% of soda and better than 70% of alumina into the solution phase.

Although it will be clearly understood that we do not wish to be limited in any way by postulated or hypothetical mechanisms for the observed beneficial effects of the process according to the invention, it is believed that under the abovementioned conditions the sodium aluminosilicates or related desilication products decompose and are replaced by calcium silicates and/or calcium aluminosilicates.

Phase diagrams published by Shor et al. suggest that the expected product of the process would be a calcium silicate hydrate. However this phase had not been observed and it appears that the presence of other components in the red mud may alter the equilibria. Structural evidence from X-ray diffraction indicates that the product has a hydrogarnet structure, although of unusual stoichiometry. It is suggested that iron substitution may be occuring, although the process is in no way limited by this hypothesis.

Figure 2:
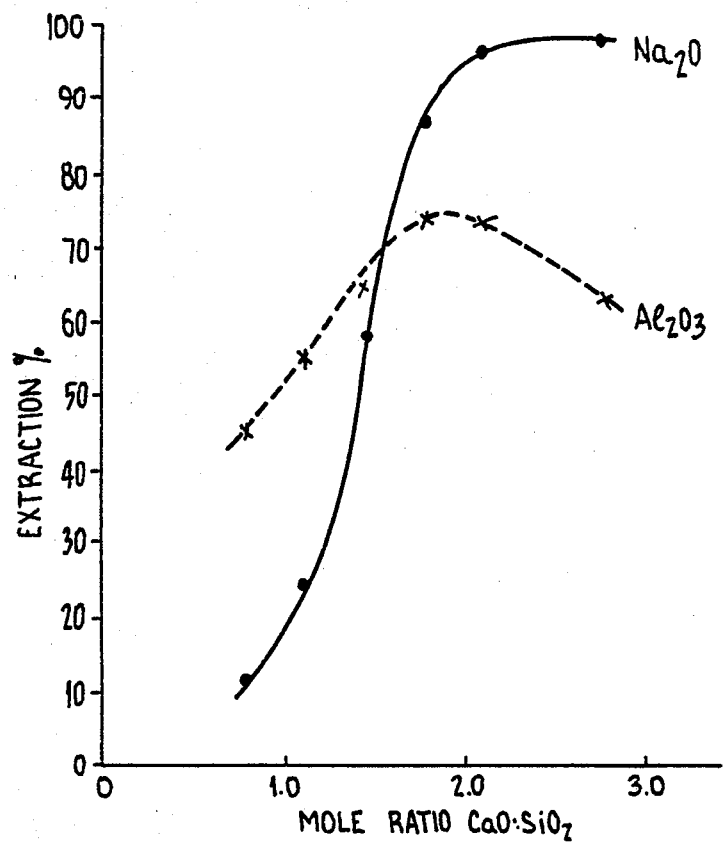

The efficiency of recovery in the digestion stage is dependent on the values of the several variables mentioned above. To illustrate this, FIGS. 1 and 2 show extraction of soda and alumina from a sample of red mud treated according to the process with variation of the caustic ratio, defined as the molar ratio $Na_2O:Al_2O_3$, and of the molar ratio $CaO:SiO_2$. From FIG. 1 it can be seen that, for good extraction, the caustic ratio should be greater than about 4, corresponding to A/C ratios less than about 0.25. In the case of the ratio of $CaO:SiO_2$, FIG. 2 shows that extraction of soda from the red mud is maximised for values of the ratio greater than about 2.0. Extraction of alumina is maximised for $CaO:SiO_2$ ratios in the range of about 1.8 to 2.2.

The process may be combined with the operation of the well known Bayer process in such a way as to markedly improve the efficiency of that process and thus constitute an improved process for the production of alumina.

Figure 3:
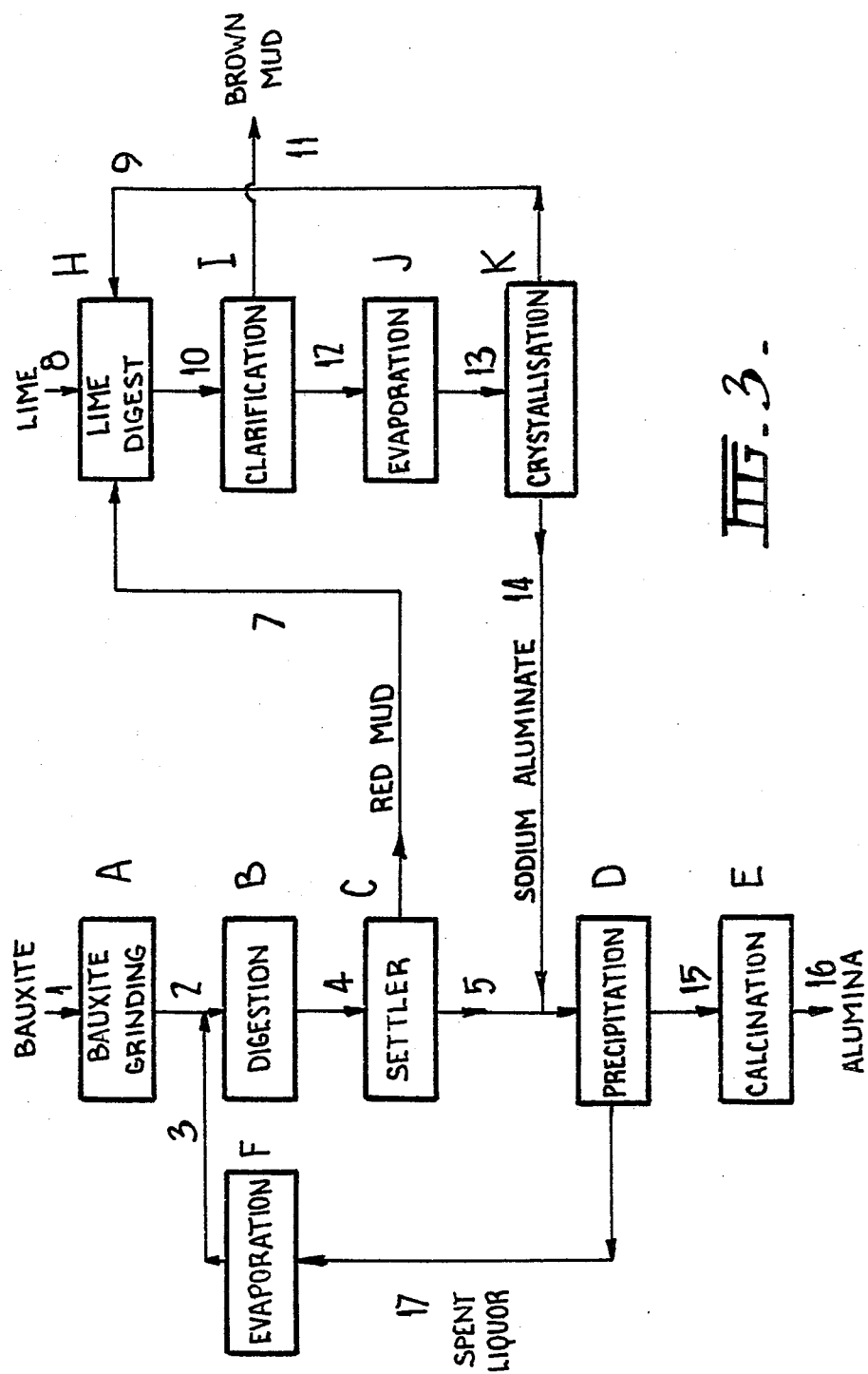

FIG. 3 illustrates one way in which this may be achieved. Raw bauxite (1) is ground at A, mixed with a recycled sodium aluminate solution (3) and subjected to digestion B according to the usual Bayer practice. A red mud slurry (7) is separated from the liquor (4) at C. The red mud (7) is mixed with lime slurry (8) and a low A/C caustic liquor (9) and digested at H in accordance with the invention in the manner described above. After digestion a "brown mud" residue, which contains dicalcium silicate, is separated (11) while the clarified liquor (12) is treated in order to obtain a liquor of low A/C suitable for recycle to the lime digest H. In one embodiment, illustrated in FIG. 1, this is achieved by evaporating the liquor at J to high concentration in order to precipitate sodium aluminate (14). The mother liquor (9) from the crystallisation (K) is recycled to digestion (H). The sodium aluminate as solids or slurry (14) is combined with the pregnant liquor, (i.e., the liquor containing the sodium aluminate to be precipitated) (5) and sent to precipitation in the normal manner. The sodium aluminate stream (14) effectively returns the soda and alumina recovered from the red mud to the Bayer circuit. The alumina after precipitation appears in the final product stream (15) while the soda is available for recycle in the spent liquor (17). An additional significant benefit is that the admixture of sodium aluminate (14) with normal spent liquor (5) raises the A/C of the liquor entering precipitation thus improving precipitation productivity. The essential purpose of the steps described under J and K, that is evaporation and sodium aluminate precipitation, is to produce a low A/C caustic liquor suitable for recycle. This purpose might also be achieved by other means and it is not intended that the invention be limited to the particular embodiment of the illustration.

The process as described in FIG. 3 provides a means to improve the efficiency of alumina production by the Bayer process by recovery of soda and alumina. Even greater improvement may be made by using other flowsheet arrangements, as for instance shown in FIG. 4.

In this case raw bauxite (1) is ground at A, mixed with a recycled sodium aluminate liquor (3) and subjected to digestion at B. Red mud slurry (6) is separated from the pregnant liquor (5) and sent to H to digest together with lime (8) and a recycled low A/C caustic liquor (9). After digestion in accordance with the invention at H the brown mud residue (11) is separated and the liquor (12) is sent to the bauxite digestion stage B, where it is mixed into the normal spent liquor recycle (19). Spent liquor from precipitation (17) is divided into two streams, one recycled to digestion (19) while the other (18) is sent to evaporation at J. Evaporated spent liquor (13) is sent to the crystalliser K to produce solid sodium aluminate (14) and a low A/C liquor (9) for recycle to digest H.

Figure 4:
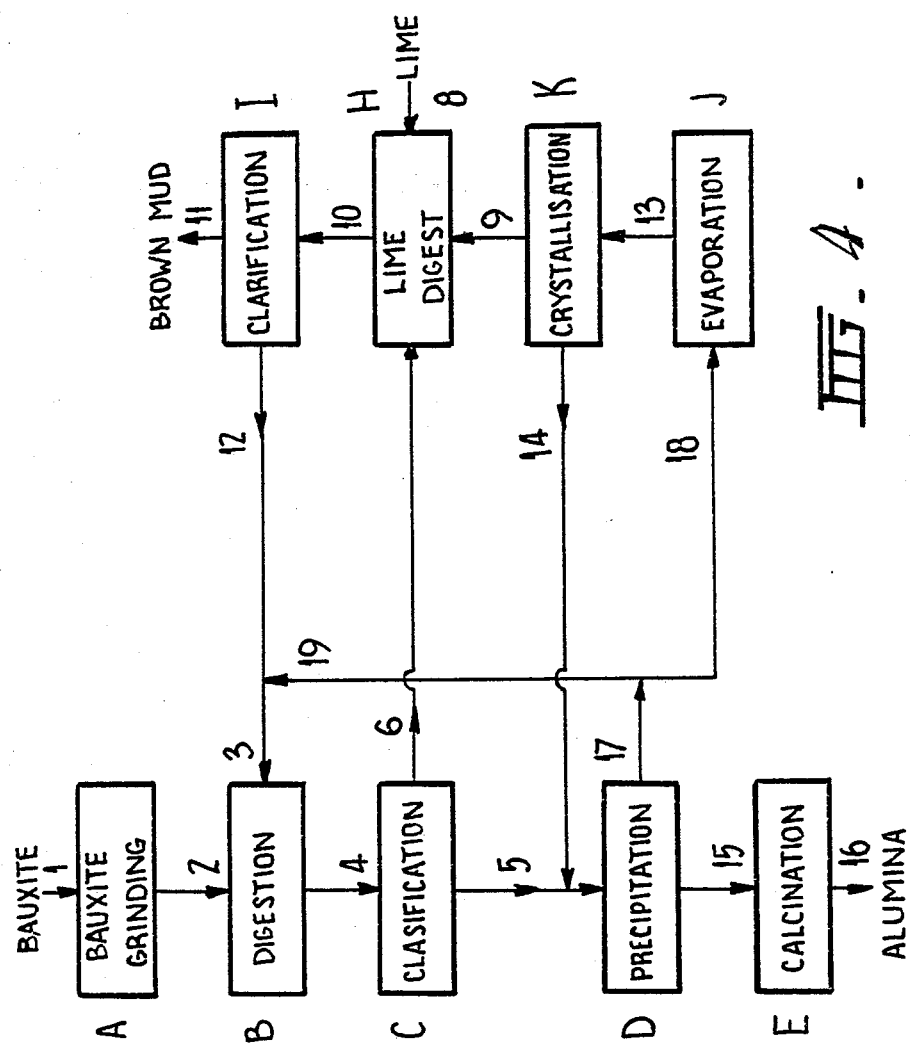

The process described in FIG. 4 improves the production of alumina in the manner already described in relation to FIG. 3. It also embodies further improvements. Principal among these is that the liquor (3) formed by mixing spent liquor (19) and the liquor from the lime digest (12) has a significantly lower A/C than normal spent liquor. This permits a higher level of bauxite input and increases the productivity of the Bayer digestion section. A further advantage is that the passage of spent liquor through deep evaporation at J enables removal of organic impurities from the liquor, raising the purity and improving productivity. The technique of purification by evaporation is a known art but would normally require additional process steps.

EXAMPLE 1

Red mud (100 g) was mixed with sodium hydroxide (110 g), aluminium hydroxide (2.4 g), calcium oxide (29.3 g) and water (650 ml). The composition of the red mud was:

$Na_2O$: 8.8%
$Al_2O_3$: 22.9%
$SiO_2$: 16.2%
$CaO$: 1.8%
$Fe_2O_3$: 34.5%
$TiO_2$: 7.6%
LOI: 7.2%

The composition was such as to give a ratio $CaO:SiO_2 = 2.13$ and an initial soda concentration of 11.2% as $Na_2O$. The mixture was heated in a stirred autoclave to 300° C. within the specified pressure range 4–9 MPa. After 1 hour a sample of the mixture was withdrawn. The composition of the solid "brown mud" was:

$Na_2O$: 0.5%
$Al_2O_3$: 5.8%
$SiO_2$: 16.8%
$CaO$: 28.5%
$Fe_2O_3$: 33.3%
$TiO_2$: 7.4%

This shows extraction of 94.1% of $Na_2O$ and 73.8% of $Al_2O_3$.

EXAMPLE 2

Red mud (150 g) of the same composition as used in example 1 was mixed with sodium hydroxide (165 g), aluminium hydroxide (3.6 g), calcium oxide (43.9 g) and water (540 ml). The composition was such as to give a ratio $CaO:SiO_2=2.13$ and an initial soda concentration of 18.1% as $Na_2O$.

The mixture was heated in a stirred autoclave to 300° C. within the specified pressure range 4–9 MPa. After 1 hour a sample of the mixture was withdrawn. The composition of the solid "brown mud" was:

$Na_2O$: 0.3%
$Al_2O_3$: 3.7%
$Sio_2$: 16.5%
CaO: 27.5%
$Fe_2O_3$: 34.9%
$TiO_2$: 7.5%

This shows extraction of 96.6% of $Na_2O$ and 84.0% of $Al_2O_3$.

We claim:

1. A process for extraction of alumina and soda from bauxite having a high silica content, which includes the steps:
   (a) grinding the bauxite, and mixing the ground bauxite with a sodium aluminate liquor;
   (b) digesting the mixture of step (a) at elevated temperature and pressure;
   (c) separating red mud solids as slurry or filter cake, containing sodium aluminosilicates, from the liquor product of step (b);
   (d) mixing the separted red mud solids with a strong caustic soda solution the soda concentration in the reactng mixture being in the range 9 to 20% $Na_2O$, and the caustic to alumina ratio being greater than 4 with sufficient lime to achieve a stoichiometric ratio with respect to the silica in the mud in the range of 1.8 to 2.2;
   (e) digesting the product of step (d) at a temperature in the range of 260° to 320° C. and under pressure of 4 to 9 MPa to dissolve soda and alumina values;
   the amount of caustic solution used in step (d) being such that the final A/C, of the digested liquor product of step (e) is in the range of 0.15 to 0.2.

2. A process according to claim 1 in which the lime employed in step (d) is sufficient to achieve a stoichimetric ratio with respect to the silica in the mud in the range of 2.0 to 2.2.

3. A process according to claim 1 in which step (e) is carried out at a temperature in the range 290° to 310° C.

4. A process according to claim 1 in which step (e) is carried out for ½ to 2 hours.

5. A process according to claim 1 wherein the product of step (e) is subjected to clarification and the liquor therefrom is returned to step (b).

* * * * *